US012538001B2

(12) United States Patent
Seyve

(10) Patent No.: US 12,538,001 B2
(45) Date of Patent: *Jan. 27, 2026

(54) ROTATION-CONTROLLED NON-LINEAR TIMELAPSE VIDEOS

(71) Applicant: Apple Inc., Cupertino, CA (US)

(72) Inventor: Christophe Seyve, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 603 days.

This patent is subject to a terminal disclaimer.

(21) Appl. No.: 17/934,834

(22) Filed: Sep. 23, 2022

(65) Prior Publication Data

US 2024/0107131 A1    Mar. 28, 2024

(51) Int. Cl.
  *H04N 21/8547*    (2011.01)
  *G06T 7/30*       (2017.01)
  *H04N 5/783*      (2006.01)

(52) U.S. Cl.
  CPC .......... *H04N 21/8547* (2013.01); *G06T 7/30* (2017.01); *H04N 5/783* (2013.01); *G06T 2207/10016* (2013.01); *G06T 2207/20024* (2013.01)

(58) Field of Classification Search
  CPC ...... H04N 21/8547; H04N 5/783; G06T 7/30; G06T 2207/10016; G06T 2207/20024
  See application file for complete search history.

(56) References Cited

U.S. PATENT DOCUMENTS

| | | | |
|---|---|---|---|
| 9,992,443 B2 | 6/2018 | Titi et al. | |
| 10,327,046 B1 | 6/2019 | Ni | |
| 11,317,020 B1 | 4/2022 | Krishnamurthy | |
| 2014/0300769 A1* | 10/2014 | Hartford | H04N 23/66 348/222.1 |
| 2016/0094801 A1 | 3/2016 | Beysserie | |
| 2017/0227162 A1* | 8/2017 | Saika | G03B 15/006 |
| 2018/0144476 A1 | 5/2018 | Smith | |
| 2020/0327313 A1 | 10/2020 | Kedarisetti | |

* cited by examiner

*Primary Examiner* — Thai Q Tran
*Assistant Examiner* — Jose M Mesa
(74) *Attorney, Agent, or Firm* — Blank Rome LLP

(57) ABSTRACT

Devices, methods, and non-transitory program storage devices are disclosed herein to perform intelligent determinations of non-linear (i.e., dynamic) image recording rates for the production of improved timelapse videos. The techniques described herein may be especially applicable to timelapse videos captured over long durations of time and/or with varying amounts of device motion/scene detail change over the course of the captured video (e.g., when a user is walking, exercising, driving, etc. during the video's capture). By smoothly varying the image recording rate of the timelapse video in accordance with estimates of device motion, the quality of the produced timelapse video may be improved (e.g., fewer long stretches of the video with no action or too little action, as well as fewer stretches of the video where there is so much rapid action in the timelapse video that it is difficult for a viewer to perceive what is happening in the video).

17 Claims, 6 Drawing Sheets

ROTATION-CONTROLLED NON-LINEAR TIMELAPSE VIDEOS

TECHNICAL FIELD

This disclosure relates generally to the field of image processing. More particularly, but not by way of limitation, it relates to techniques for producing rotation-controlled timelapse videos with non-linear (i.e., dynamic) image frame recording rates.

BACKGROUND

The advent of portable integrated computing devices has caused a wide proliferation of cameras and video devices. These integrated computing devices commonly take the form of smartphones or tablets and typically include general purpose computers, cameras, sophisticated user interfaces including touch-sensitive screens, and wireless communications abilities, e.g., through Wi-Fi, Long Term Evolution (LTE), New Radio (NR), or other cellular-based or wireless technologies. The wide proliferation of these integrated devices provides opportunities to use these devices' capabilities to perform tasks that would otherwise require dedicated hardware and software. For example, integrated devices such as smartphones and tablets typically have two or more embedded cameras capable of capturing high quality video images. These cameras generally amount to lens/camera hardware modules that may be controlled through a general-purpose computer using firmware and/or other software (e.g., applications or "Apps") and a user interface including touchscreens, fixed buttons, and/or touchless controls, such as voice controls.

The integration of cameras into communication devices such as smartphones and tablets has also enabled people to share images and videos in ways never before possible. It is now very popular acquire and immediately share photos and videos with other people by sending the photos and videos via text message, SMS, email, or by uploading the photos and videos to an Internet-based website, such as a social networking site or a photo- or video-sharing website.

As mentioned above, immediately sharing videos recorded by integrated electronic devices is possible, however, bandwidth limitations and upload times may significantly constrain the length of videos that can easily be shared with third parties. In many instances, a short video clip that captures the essence of the entire action that has been recorded may be desirable. The duration of the video clip may depend on the subject matter of the video clip. For example, a several hours' long car ride or an evening at a party might be able to be reduced to a timelapse video clip lasting only a minute or two. Other types of actions, such as a sunset or the movement of clouds, might be better expressed in a clip of twenty to forty seconds.

While a timelapse video having a shortened duration may be desired, a user may often wish to capture the video over a much greater length of time, for example, over the duration of several minutes, hours, or even days, the user also may not know how long they will be capturing video for when the recording operation begins. As mentioned above, a user may desire to reduce the length of the video to provide a shortened, timelapse video that is of a shareable length—but still captures the essence of the underlying action in the captured video.

However, if a constant image frame recording rate (i.e., a recording frame rate that is agnostic to changes in the capturing device's position and/or changes in the underlying content being captured) is used over the duration of the video image stream that will be used to generate the timelapse video, then the timelapse video that is generated will likely be visually unpleasing, e.g., including long stretches in the generated timelapse video with little to no action that are boring to a viewer and/or stretches of the generated timelapse video where there is so much action in a short period of time that it is difficult for a viewer to perceive what is happening in that portion of the generated timelapse video.

Thus, there is a need for improved methods, apparatuses, computer readable media, and systems to intelligently determine non-linear (i.e., dynamic) image recording rates for the production of timelapse videos.

SUMMARY

Devices, methods, and non-transitory program storage devices are disclosed herein to perform intelligent determinations of non-linear (i.e., dynamic) image recording rates for the production of improved timelapse videos. The techniques described herein may be especially applicable to timelapse videos captured over long durations of time and/or with varying amounts of device motion/scene detail change over the course of the captured video, e.g., in situations wherein a user is walking, running, or otherwise moving around (sometimes referred to as "hyperlapses") or driving (sometimes referred to as "drivelapses"), as they are capturing the timelapse video. By smoothly varying the image recording rate of the timelapse video in accordance with estimates of device motion, the quality of the produced timelapse video may be improved (e.g., fewer long stretches of the video with no action or too little action, as well as fewer stretches of the video where there is so much rapid action in the timelapse video that it is difficult for a viewer to perceive what is happening in the video).

According to some embodiments, there is provided a device, comprising: a memory; one or more image capture devices; one or more positional sensors; and one or more processors operatively coupled to the memory, wherein the one or more processors are configured to execute instructions causing the one or more processors to: obtain an incoming image stream comprising one or more first images captured by a first image capture device of the one or more image capture devices, wherein the incoming image stream is captured at a first image capture rate, wherein the one or more first images are recorded to the memory at a first image recording rate, and wherein the one or more first images are timestamped according to a first timeline; obtain a positional data stream from the one or more positional sensors, wherein the positional data stream is timestamped according to the first timeline; determine based, at least in part, on the obtained positional data stream, a second image recording rate that is different than the first image recording rate; obtain one or more second images from the incoming image stream, wherein the one or more second images are recorded to the memory at the second image recording rate, wherein the one or more second images are captured subsequently to the one or more first images, and wherein the one or more second images are timestamped according to the first timeline; and then combine at least the one or more first images and the one or more second images to generate a timelapse video.

In some embodiments, the first image recording rate may be determined based, at least in part, on obtained positional data that is timestamped corresponding to a time on the first timeline before the capture of the one or more first images.

In other embodiments, the second image recording rate may be determined based, at least in part, on obtained positional data that is timestamped corresponding to a time on the first timeline after the capture of the one or more first images. In some embodiments, the second image recording rate may be further configured to be a factor of the image capture rate of the first image capture device, or the image capture rate of the first image capture device may be set to be a multiple of the second image recording rate (i.e., to avoid judder effects in the resulting produced timelapse video).

In still other embodiments, the second image recording rate may be further determined based, at least in part, on an image registration operation performed between a pair of the one or more first images, wherein, e.g., the image registration operation may be configured to filter out, from the image registration operation, portions of the pair of the one or more first images that are located below an estimated horizon level.

In yet other embodiments, a temporal filtering effect may be applied to the determined change in image recording rate, wherein, e.g., one or more third images are obtained from the incoming image stream In such embodiments, the one or more third images are captured by the first image capture device at one or more image recording rates having recording rate values between the first image recording rate and the second image recording rate, and are captured subsequently to the one or more first images and prior to the one or more second images. The generated timelapse video may then combine the one or more third images with the one or more first images and the one or more second images.

Various non-transitory program storage device (NPSD) embodiments are also disclosed herein. Such NPSDs are readable by one or more processors. Instructions may be stored on the NPSDs for causing the one or more processors to perform any of the embodiments disclosed herein. Various image processing methods are also disclosed herein, in accordance with the device and NPSD embodiments disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Exemplary Timelapse Video Image Capture and Recording Timelines

Figure 1:
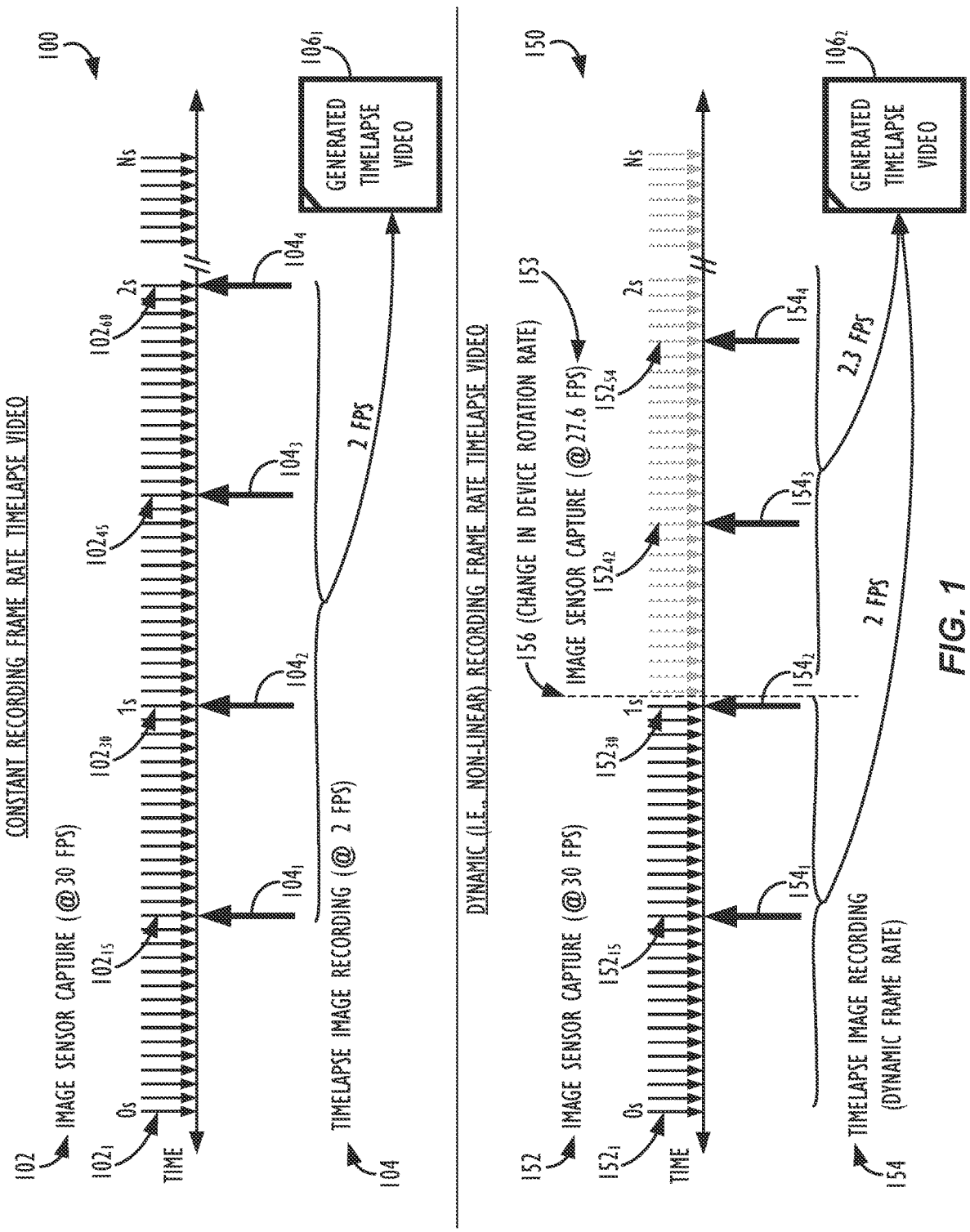
FIG. 1 illustrates examples of a constant recording frame rate timelapse video timeline and a dynamic recording frame rate timelapse video timeline, according to various embodiments.

Turning now to FIG. 1, examples of a constant recording frame rate timelapse video timeline (100) and a dynamic recording frame rate timelapse video timeline (150) are shown, according to various embodiments. Looking first at constant recording frame rate timelapse video timeline 100, an image sensor is capturing images at an exemplary image sensor capture rate 102 (e.g., 30 frames per second, or "fps"). Looking at timeline 100, the first image captured by the image sensor is labeled $102_1$, while the fifteenth image captured by the image sensor is labeled $102_{15}$, the thirtieth image captured by the image sensor (located at 1 s along the timeline) is labeled $102_{30}$, and so forth. In FIG. 1, an exemplary two second portion of timeline is shown, for illustrative purposes, thought it is to be understood that the timeline may continue for up to "n" seconds, i.e., for as long as a user has indicated a desire to continue capturing the timelapse video.

Distinct from the rate at which images are "captured" by an image sensor, the techniques herein define a so-called image "recording" frame rate, which reflects the rate at which captured images are stored to a memory, e.g., to be used in an eventual generated timelapse video (e.g., timelapse video $106_1$, in the example of timeline 100). In the example of timeline 100, the timelapse image recording frame rate is shown as being 2 fps, that is, two frames being recorded to memory per second (i.e., an image being recorded to memory every 500 ms). The recording frame rate is illustrated along timeline 100 by the large arrows pointing to the first image recorded to memory ($104_1$) being the fifteenth image captured ($102_{15}$), followed by the second image recorded to memory ($104_2$) being the thirtieth image captured ($102_{30}$), followed by the third image recorded to memory ($104_3$) being the forty-fifth image captured ($102_{45}$), and so forth. As illustrated, this results in a timelapse video $106_1$ being generated with an image recording rate of 2 fps (though it is to be understood that the actual playback of timelapse video $106_1$ at display time could be sped up or slowed down as desired, e.g., played back at 15 fps, 30 fps, 60 fps, etc.).

As alluded to above, depending on the position and/or movement of the image capture device during the capture of the incoming image stream (e.g., in terms of a number of degrees of rotation, a number of degrees of rotation per second, etc.), this constant 2 fps image recording frame rate may be too high, e.g., for when there are long stretches of video with little to no movement or action and, likewise, the 2 fps image recording frame rate may be too low, e.g., for when the image capture device is moving or rotating rapidly during the capture of the incoming image stream. Thus, it would be desirable to be able to intelligently and dynamically change the image recording frame rate, i.e., in a so-called "non-linear" fashion.

Turning now to dynamic recording frame rate timelapse video timeline 150, an image sensor is again capturing images at an exemplary image sensor capture rate 152 (e.g., 30 fps). Looking at timeline 150, the first image captured by the image sensor is labeled $152_1$, while the fifteenth image captured by the image sensor is labeled $152_{15}$, and so forth. By contrast with constant recording frame rate timelapse video timeline 100, in dynamic recording frame rate timelapse video timeline 150, the rate at which captured image frames are actually recorded or stored to memory for usage in the generated timelapse video 106 may change dynamically over the duration of the image stream capture. In other words, the timelapse image recording 154 made from the timeline 150 is non-linear, i.e., it has a dynamic frame rate.

As may now be appreciated, in the example of timeline 150, the timelapse image recording frame rate is shown as beginning at 2 fps (i.e., during the recording of image frames $154_1$ and $154_2$ to memory), but, after the 1 s mark on the timeline 150, the timelapse image recording frame rate is shown as dynamically changing to 2.3 fps (i.e., during the recording of image frames $154_3$, $154_4$, and so forth to memory). In this example timeline 150, the dynamically determined updated image recording frame rate of 2.3 fps is achieved by adjusting the image sensor's capture rate from 30.0 fps to 27.6 fps and then recording every 12th image frame (rather than every 15th image frame) that is captured at the new image sensor capture rate of 27.6 fps (i.e., recording image $152_{42}$, $152_{54}$, and so forth). In other words, 27.6 (i.e., the new capture fps) divided by 12 (i.e., recording every 12th image frame)=the desired 2.3 fps updated image recording frame rate. As illustrated, use of a dynamic or non-linear image recording frame rate results in a timelapse video $106_2$ being generated with a blended effective image recording rate that is between 2 fps and 2.3 fps. As will be explained herein, according to some embodiments, one or more pieces of information received or observed about the image capture device (and/or the contents of the images being captured) during the capture of the video image stream may be an impetus for determining a change in image recording rate (e.g., from 2 fps to 2.3 fps, in the example of timeline 150). As illustrated in timeline 150, there is an observed change in the image capture device's rate of rotation (156) at approximately the 1 s mark on the timeline that has caused the device to increase its image recording frame rate from 2 fps to 2.3 fps. For example, an increased rotational rate of the image capture device around the 1 s mark (e.g., as measured by one or more positional sensors) may cause more changes in the scene content, so recording more images during this portion of the captured video image stream may cause the generated timelapse video $106_2$ to be less jerky, choppy, and/or unpleasant during these moments of increased image capture device rotation (and/or changing conditions in the captured scene).

Exemplary Schemes for Producing Rotation-Controlled Non-Linear Timelapse Videos

Figure 2:
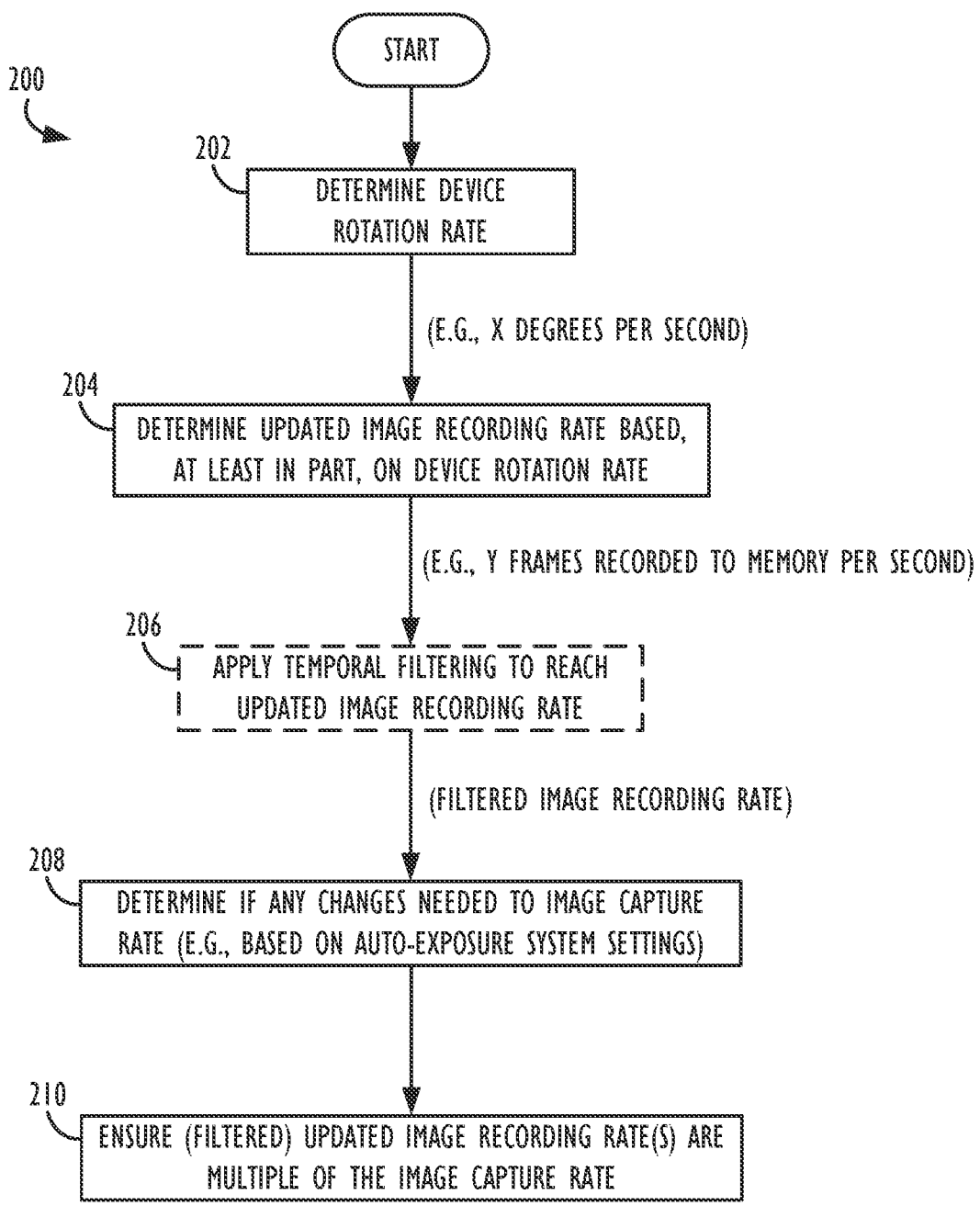
FIG. 2 illustrates an example of producing rotation-controlled non-linear timelapse videos, according to various embodiments.

Turning now to FIG. 2, an example (200) of producing rotation-controlled non-linear timelapse videos is shown, according to various embodiments. The example 200 begins at Step 202 with a device (e.g., a device having one or more embedded image capture device) determining a current rotation rate, e.g., in terms of degrees of rotation per second, or other unit of measurement, as may be desired for a given implementation). The current rotation rate may be estimated from one or more positional sensors embedded in the device, e.g., a gyroscope, magnetometer, accelerometer, and/or IMU(s).

Next, at Step 204, the method may determine an updated image recording rate based, at least in part, on device rotation rate determined at Step 202. For example, the updated image recording rate may be expressed in terms of a target number of image frames to record to memory per second during the capture of the video image stream. For example, if a determined rotation rate of the image capture device is measured to be less than 1 degree per second, then the updated image recording rate may be changed to ⅛ fps (i.e., one frame recorded every 8 seconds); whereas, if the determined rotation rate of the image capture device is measured to be 10 degree per second (i.e., a much greater amount of rotation), then the updated image recording rate may be changed to 12 fps. (These numbers and rates are given only for illustrative and explanatory purposes.) In some embodiments, additional factors, such as camera tuning parameters, the camera's field of view (FOV), minimum/maximum permitted timelapse video duration or file size, or playback frame rate may also be used in the determination of the updated image recording rate.

Next, if so desired by a given implementation, at Step 206, the method may apply temporal filtering operations to reach updated image recording rate. For example, if the initial image recording rate is at 2 fps, and it is determined at Step 204 that, e.g., based on a detected device rotation rate, the updated image recording rate should be 10 fps, then the temporal filtering operation at Step 206 may plot a course of adjusting the image recording rate from its initial value to its target updated value. For example, the image recording frame rate could begin at 2 fps, then some number of milliseconds later change to 3 ps, then some number of milliseconds later change to 5 ps, then some number of milliseconds later change to 10 fps. In that way, the transition from recording at 2 fps to recording at 10 fps may occur more smoothly, resulting in less choppiness in the generated encoded timelapse video.

In some embodiments, at Step 208, the device may also be concurrently evaluating one or more other device systems to determine if any changes needed to image capture rate independent of the determinations being made based on device rotation rate. For example, if, due to scene brightness, the image capture device's auto-exposure system settings have changed to capture images using a 200 ms exposure time (i.e., for a maximum capture rate of 5 fps), then the determined image recording rate simply cannot exceed 5 fps, i.e., during intervals when the image sensor itself is only capturing images at 5 frames per second.

Moreover, at Step 210, and according to some embodiments, it may further be desirable to ensure that ensure that the updated image recording rate (as well as any temporally-filtering image recording rates used by the image capture device while it is moving towards the target of the updated image recording rate) are factors of the image sensor's image capture rate. For example, using the example above, if the image sensor is capturing images at a rate of 30 fps, then acceptable image recording rates may be all multiples of 30, i.e.: 1 fps, 2 fps, 3 fps, 5 fps, 6 fps, 10 fps, 15 fps, or 30 fps (wherein a 30 fps recording rate means that the device is recording and keeping each image that is captured by the sensor, and 1 fps recording rate means that that the device is recording and keeping only every thirtieth image that is captured by the sensor, and so on). Conversely, if an updated image recording rate is determined to be a value such as 0.0946 fps, and is used to drive the determination of a new image sensor capture rate, then the image sensor may be configured to capture images at any frame rate multiple of N*0.0946 fps, wherein N can be any integer value, subject to constraints of the required exposure times determined, e.g., by an auto-exposure system, and the capabilities of the image sensor. For example, if N=100, then the image sensor may be run at a capture frame rate of 9.46 fps, wherein only every 100th captured image frame is recorded to memory, thereby achieving the desired updated image recording rate of 0.0946 fps.

Figure 3:
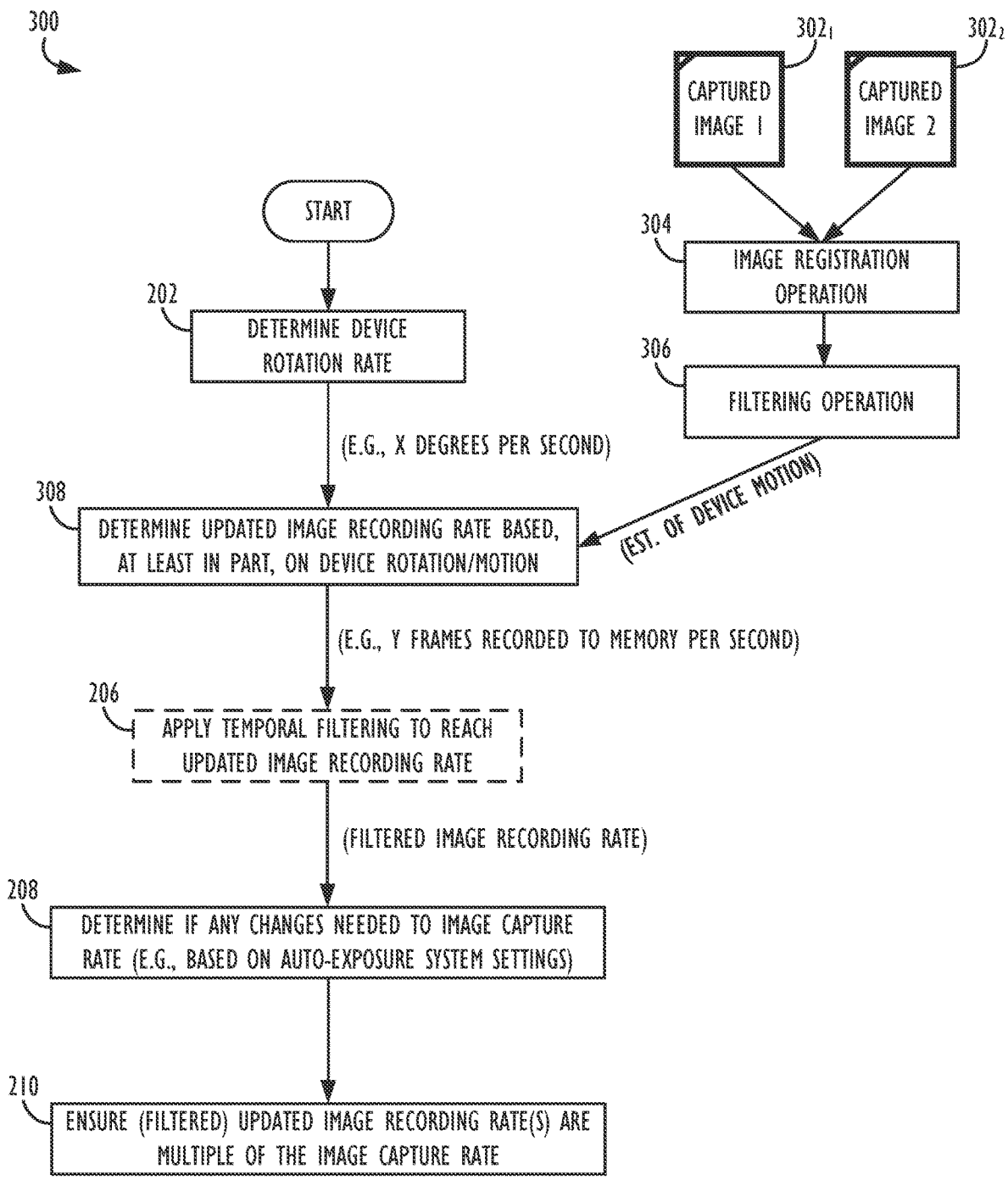
FIG. 3 illustrates another example of producing rotation-controlled non-linear timelapse videos, according to various embodiments.

Turning now to FIG. 3, another example (300) of producing rotation-controlled non-linear timelapse videos is shown, according to various embodiments. In comparison with example 200, example 300 further leverages image registration information in the rotation-controlled non-linear timelapse video creation process. As described above with respect to FIG. 2, example 300 may begin at Step 202 by determining a current rotation rate for the capturing device. However, at Step 308, the update image recording rate may be determined based, at least in part, on both a determined device rotation rate as well as an estimate of device motion, e.g., as may be obtained from one or more image registration operations 304 performed on two or more captured images (e.g., exemplary images 3021 and 3022, shown in FIG. 3) from the captured image stream.

According to some such embodiments, the performance of image registration operations 304 between two images of the captured image stream may be used to help overcome various limitations of using only a device positional sensor, such as a gyroscope, in the determination of updated image recording rates, e.g., at times when the image capture device is traveling in a "straight" line for long periods of time. For example, if a user is recording a timelapse video while driving down a long, straight highway during a road trip, the translation speed of device and/or the distance to objects in the scene (e.g., mountains in the distance) may be unknown or difficult to estimate accurately. Thus, if the recording frame rate is not updated in an intelligent fashion, close objects in the scene may end up moving too much from one frame to the next in the generated timelapse video, while far objects will not move enough to keep the generated timelapse video interesting visually.

Thus, in order to help control the amount of scene content "movement" appearing in the final generated timelapse video, e.g., in terms of the average displacement of objects appearing in the scene (as measured in a number of pixels of displacement per image frame), the input of the frame rate decision may be further based, at least in part, upon: an array of motion vectors (e.g., as computed from an image registration or optical flow operation at Step 304) that is used to measure the local object movements (e.g., in terms of pixels per second, a homography model that provides translation and zooming factors, etc.); and a filtering operation (Step 306) that is used to filter out certain motion vectors of points in the captured scene (e.g., points in the scene that are located below a horizon level, as estimated using a device accelerometer). (Note: According to some implementations, it may be desirable to filter out motion vectors from points below the estimated horizon level, as they may be too close to the image capture device to provide useful information about the movement of relevant scene content, which, in the case of drivelapse videos, is likely to be landscape or other scenery in the far distance of the captured scene.) In other embodiments, the filtering operation at Step 306 may additionally, or alternatively, be based on a scene semantic segmentation operation, e.g., filtering out "sky" pixels or "landscape" pixels, etc. Then, e.g., based on an amount of scene content movement (e.g., translation and/or zooming) that has been predetermined to be a pleasant or desired amount of scene content movement per image frame to viewers of timelapse videos and/or other tuning parameters, the updated image recording frame rate may be deduced at returned to Step 308. In some implementations, the updated image recording frame rate may be based, at least in part, on an estimated zooming factor for the scene. For example, if the objects in the scene are increasing their size at a rate of 4× per second, but there is a desired scene zooming factor of 2× per second, then an updated image recording frame rate of 2 fps may be determined.

Once the final determination of the updated image recording rate has been made at Step 308, the process 300 may proceed largely as described above with respect to example 200 of FIG. 2, that is, by proceeding to generate the final timelapse video, according to the aforementioned Steps 206, 208, and 210. It is to be understood that the steps above described in FIGS. 2 and 3 may be performed iteratively, e.g., in a loop, for as long as the video image stream is being captured, thus allowing the device to repeatedly be evaluating instantaneous rotation rates (and, if desired, image registration operations)

Figure 4A:
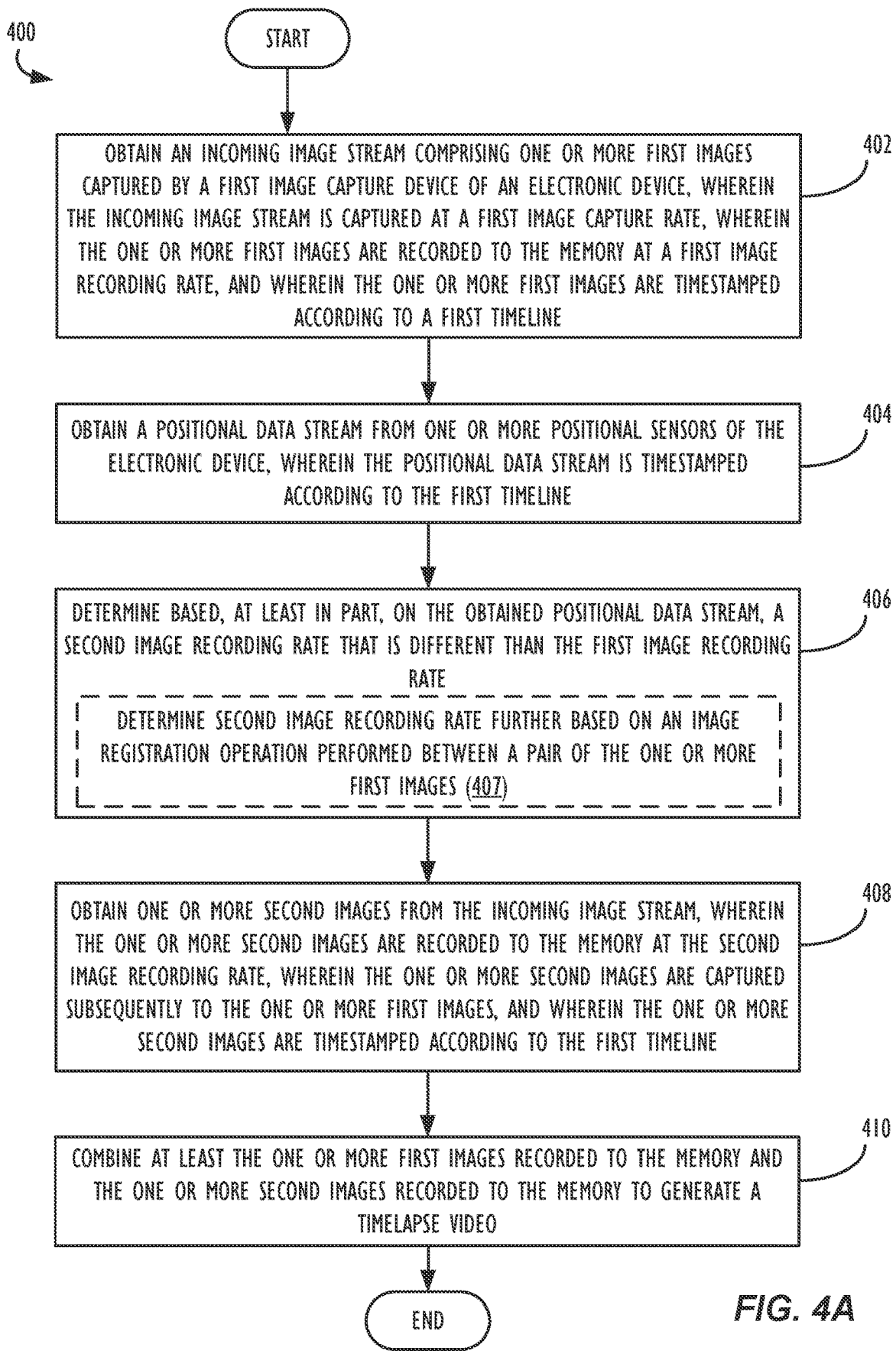
FIGS. 4A-4B are flow charts illustrating methods of performing rotation-controlled non-linear timelapse video creation, according to various embodiments.
Figure 4B:
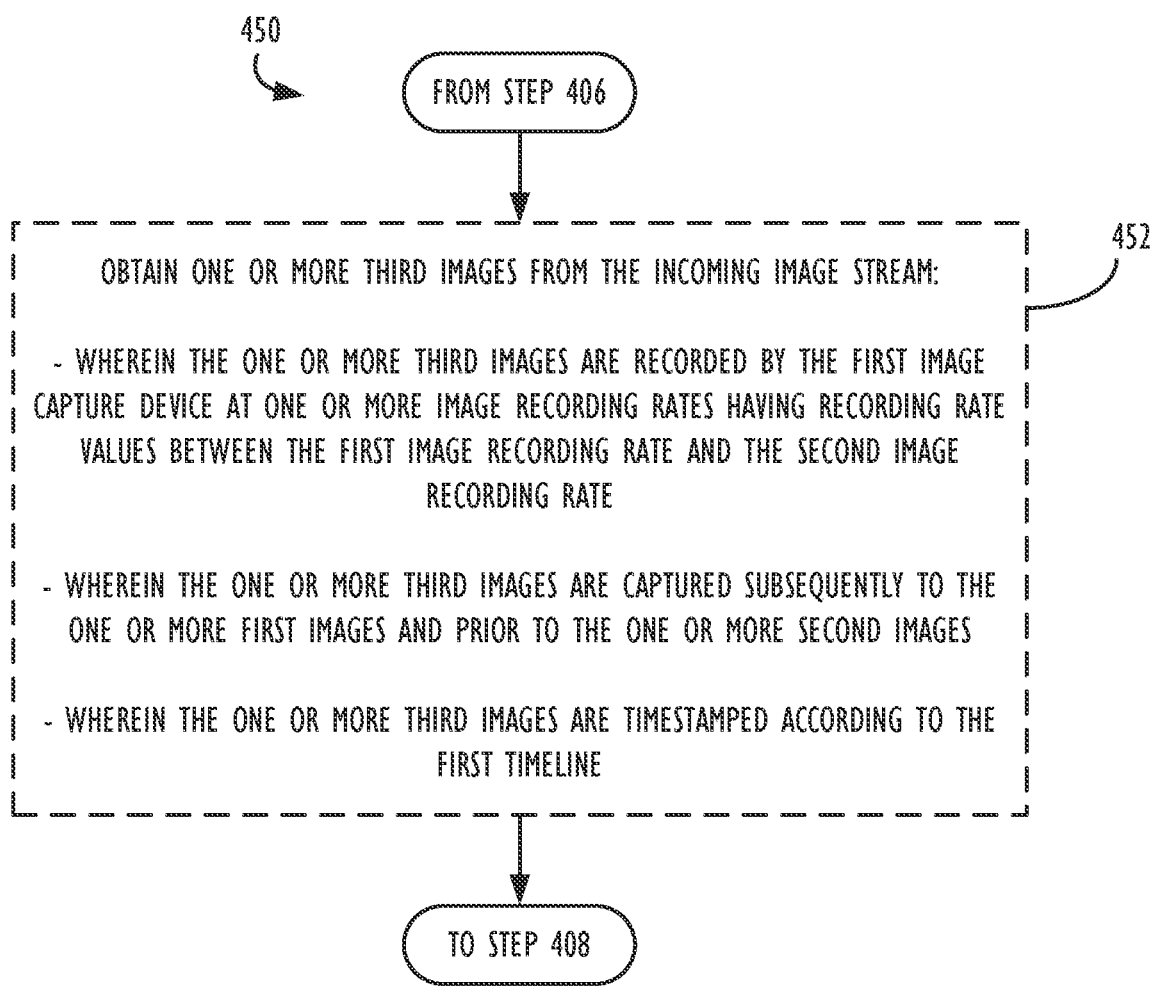

Exemplary Methods for Performing Rotation-Controlled Non-linear Timelapse Video Creation FIGS. 4A-4B are flow charts illustrating methods of performing rotation-controlled non-linear timelapse video creation, according to various embodiments.

Turning first to FIG. 4A, a method 400 is illustrated for performing rotation-controlled non-linear timelapse video creation. First, at Step 402, the method 400 may obtain an incoming image stream comprising one or more first images captured by a first image capture device of an electronic device, wherein the incoming image stream is captured at a first image capture rate, wherein the one or more first images are recorded to the memory at a first image recording rate, and wherein the one or more first images are timestamped according to a first timeline. Next, at Step 404, the method 400 may obtain a positional data stream from one or more positional sensors of the electronic device, wherein the positional data stream is also timestamped according to the first timeline. It is to be understood that the positional data stream may be sampled at a much different rate (e.g., a much higher rate) than either the image capture rate or the image recording rate, and, thus, according to some implementations, multiple positional data samples may be averaged or otherwise combined to determine an estimate of an amount of the device's positional change (e.g., in terms of degrees of rotation per second) during the capture of any particular image from the incoming image stream.

Next, at Step 406, the method 400 may determine based, at least in part, on the obtained positional data stream, a second image recording rate that is different than the first image recording rate. In some embodiments, at Step 407, the second image recording rate may be further determined based on an image registration operation performed between a pair of the one or more first images. As described above with reference to FIG. 3, in some such embodiments, based on an image registration operation performed between two images in a captured image stream, all image features determined to be below an estimated horizon level (or belonging to certain semantic class(es)) may be filtered out from the image registration operation.

Next, at Step 408, the method 400 may then obtain one or more second images from the incoming image stream, wherein the one or more second images are recorded to the memory at the second image recording rate, wherein the one or more second images are captured subsequently to the one or more first images, and wherein the one or more second images are also timestamped according to the first timeline.

Finally, at Step 410, the method 400 may combine at least the one or more first images and the one or more second images to generate a timelapse video. As described above, this may result in a timelapse video having varying or "non-linear" image recording framerates over the duration of the produced timelapse video (e.g., increased recording frame rates when there is a lot of rotation/motion in the captured video images, and decreased recording frame rates when there are long durations of low rotation/motion estimates for the image capture device).

Turning now to FIG. 4B, a method 450 is illustrated providing further details to the method 400 of performing temporal filtering in the production of rotation-controlled non-linear timelapse videos that was described above with respect to FIG. 4A. First, at Step 452, the method 450 may continue operations from Step 406 of FIG. 4A by obtaining one or more third images from the incoming image stream. In some such embodiments employing temporal filtering operations, the one or more third images may be captured by the first image capture device at one or more image recording rates having recording rate values between the first image recording rate and the second image recording rate, wherein the one or more third images are captured subsequently to the one or more first images and prior to the one or more second images and are also timestamped according to the first timeline.

Once the desired amount of temporal filtering has been applied, the method 450 may return operation to Step 408 of FIG. 4A, wherein the determined second image record rate has been reached by the image capture device. As may be understood, by temporally filtering the change of the image capture device's recording rate from the first image recording rate to the second image recording rate (i.e., by implementing the change in image recording rate over a span of tens or hundreds of captured image frames, rather than instantaneously), a smoother and more visually-pleasing final timelapse video may be produced.

Exemplary Electronic Computing Devices

Figure 5:
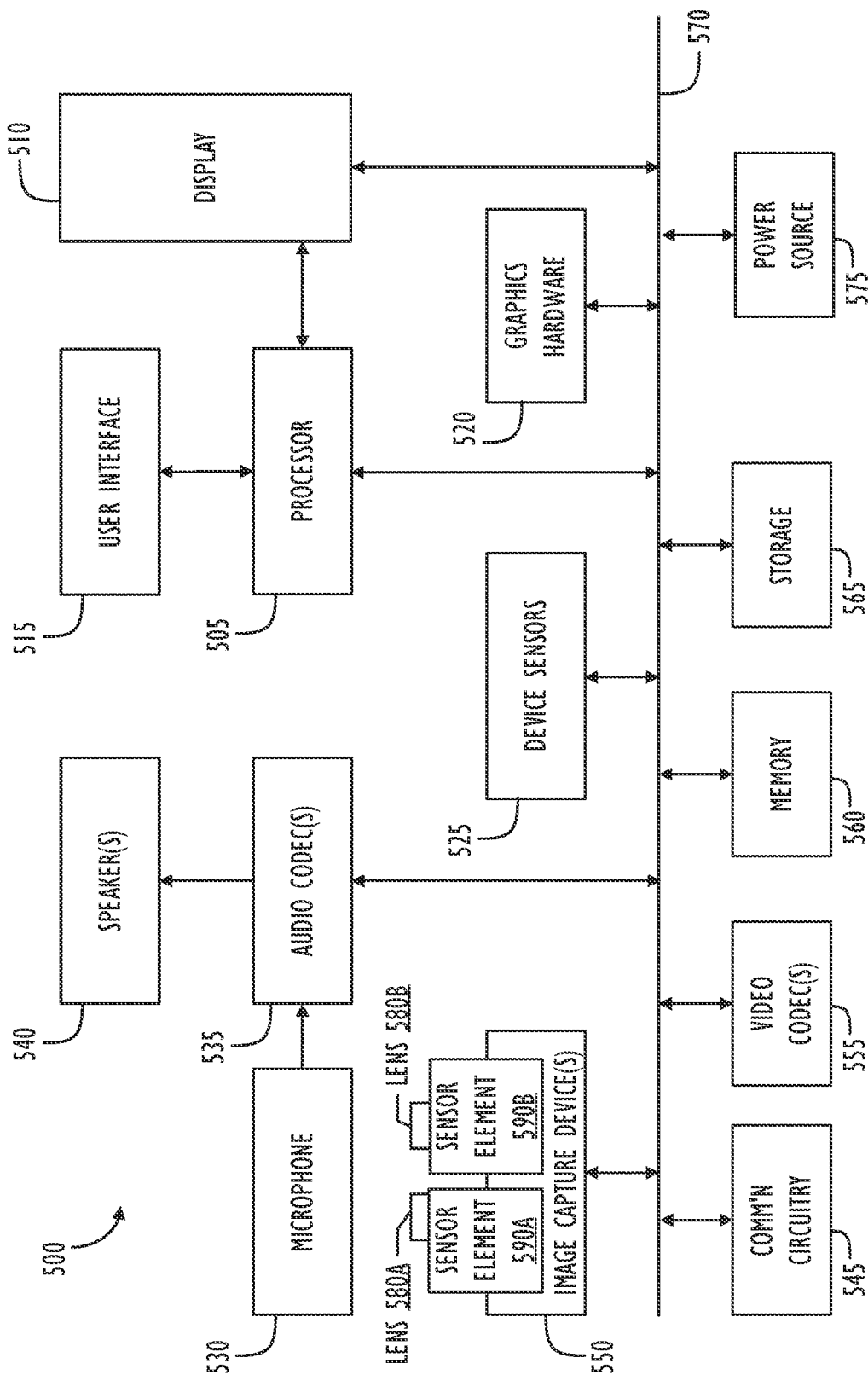
FIG. 5 is a block diagram illustrating a programmable electronic computing device, in which one or more of the techniques disclosed herein may be implemented.

Referring now to FIG. 5, a simplified functional block diagram of illustrative programmable electronic computing device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensors/ambient light sensors, or accelerometers, magnetometers, inertial measurement units, gyroscopes, and/or other types of positional sensors capable of capturing positional data streams), microphone 530, audio codec(s) 535, speaker(s) 540, communications circuitry 545, image capture device(s) 550, which may, e.g., comprise multiple camera units/optical image sensors having different characteristics or abilities (e.g., Still Image Stabilization (SIS), high dynamic range (HDR), optical image stabilization (OIS) systems, optical zoom, digital zoom, etc.), video codec(s) 555, memory 560, storage 565, and communications bus 570.

Processor 505 may execute instructions necessary to carry out or control the operation of many functions performed by electronic device 500 (e.g., such as the processing of images in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 510 may display a video stream as it is captured while processor 505 and/or graphics hardware 520 and/or image capture circuitry contemporaneously generate and store the video stream in memory 560 and/or storage 565. Processor 505 may be a system-on-chip (SOC) such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device(s) 550 may comprise one or more camera units configured to capture images, e.g., images which may be processed to help further improve the efficiency of VIS operations, e.g., in accordance with this disclosure. Image capture device(s) 550 may include two (or more) lens assemblies 580A and 580B, where each lens assembly may have a separate focal length. For example, lens assembly 580A may have a shorter focal length relative to the focal length of lens assembly 580B. Each lens assembly may have a separate associated sensor element, e.g., sensor elements 590A/590B. Alternatively, two or more lens assemblies may share a common sensor element. Image capture device(s) 550 may capture still and/or video images. Output from image capture device(s) 550 may be processed, at least in part, by video codec(s) 555 and/or processor 505 and/or graphics hardware 520, and/or a dedicated image processing unit or image signal processor incorporated within image capture device(s) 550. Images so captured may be stored in memory 560 and/or storage 565.

Memory 560 may include one or more different types of media used by processor 505, graphics hardware 520, and image capture device(s) 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods or processes described herein. Power source 575 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 500.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
    a memory;
    one or more image capture devices;
    one or more positional sensors; and
    one or more processors operatively coupled to the memory, wherein the one or more processors are configured to execute instructions causing the one or more processors to:
        obtain an incoming image stream comprising one or more first images captured by a first image capture device of the one or more image capture devices, wherein the incoming image stream is captured at a first image capture rate, wherein the one or more first images are recorded to the memory at a first image recording rate, and wherein the one or more first images are timestamped according to a first timeline;
        obtain a positional data stream from the one or more positional sensors, wherein the positional data stream is timestamped according to the first timeline;
        determine based, at least in part, on the obtained positional data stream and an image registration operation performed between a pair of the one or more first images, a second image recording rate that is different than the first image recording rate;
        obtain one or more second images from the incoming image stream, wherein the one or more second images are recorded to the memory at the second image recording rate, wherein the one or more second images are captured subsequently to the one or more first images, and wherein the one or more second images are timestamped according to the first timeline; and
        combine at least the one or more first images and the one or more second images to generate a timelapse video.

2. The device of claim 1, wherein the first image recording rate is determined based, at least in part, on obtained positional data that is timestamped corresponding to a time on the first timeline before the capture of the one or more first images.

3. The device of claim 1, wherein the second image recording rate is determined based, at least in part, on obtained positional data that is timestamped corresponding to a time on the first timeline after the capture of the one or more first images.

4. The device of claim 1, wherein the image registration operation is configured to filter out, from the image registration operation, portions of the pair of the one or more first images that are located below an estimated horizon level.

5. The device of claim 1, further comprising instructions causing the one or more processors to:
    obtain one or more third images from the incoming image stream,
    wherein the one or more third images are captured by the first image capture device at one or more image recording rates having recording rate values between the first image recording rate and the second image recording rate,
    wherein the one or more third images are captured subsequently to the one or more first images and prior to the one or more second images,
    wherein the one or more third images are timestamped according to the first timeline, and
    wherein the instructions causing the one or more processors to generate a timelapse video further comprise instructions causing the one or more processors to combine the one or more third images with the one or more first images and the one or more second images.

6. The device of claim 1, wherein the second image recording rate is a factor of an image capture rate of the first image capture device, or wherein the image capture rate of the first image capture device is set to be a multiple of the second image recording rate.

7. A non-transitory program storage device comprising instructions stored thereon to cause one or more processors to:
    obtain an incoming image stream comprising one or more first images captured by a first image capture device of an electronic device, wherein the incoming image stream is captured at a first image capture rate, wherein the one or more first images are recorded to a memory at a first image recording rate, and wherein the one or more first images are timestamped according to a first timeline;
    obtain a positional data stream from one or more positional sensors of the electronic device, wherein the positional data stream is timestamped according to the first timeline;
    determine based, at least in part, on the obtained positional data stream and an image registration operation performed between a pair of the one or more first images, a second image recording rate that is different than the first image recording rate;
    obtain one or more second images from the incoming image stream, wherein the one or more second images are recorded to the memory at the second image recording rate, wherein the one or more second images are captured subsequently to the one or more first images, and wherein the one or more second images are timestamped according to the first timeline; and
    combine at least the one or more first images and the one or more second images to generate a timelapse video.

8. The non-transitory program storage device of claim 7, wherein the first image recording rate is determined based, at least in part, on obtained positional data that is timestamped corresponding to a time on the first timeline before the capture of the one or more first images.

9. The non-transitory program storage device of claim 7, wherein the second image recording rate is determined based, at least in part, on obtained positional data that is timestamped corresponding to a time on the first timeline after the capture of the one or more first images.

10. The non-transitory program storage device of claim 7, wherein the image registration operation is configured to filter out, from the image registration operation, portions of the pair of the one or more first images that are located below an estimated horizon level.

11. The non-transitory program storage device of claim 7, further comprising instructions causing the one or more processors to:
    obtain one or more third images from the incoming image stream,
    wherein the one or more third images are recorded by the first image capture device at one or more image recording rates having recording rate values between the first image recording rate and the second image recording rate,
    wherein the one or more third images are captured subsequently to the one or more first images and prior to the one or more second images, and
    wherein the one or more third images are timestamped according to the first timeline, and
    wherein the instructions causing the one or more processors to generate a timelapse video further comprise instructions causing the one or more processors to combine the one or more third images with the one or more first images and the one or more second images.

12. The non-transitory program storage device of claim 7, wherein the second image recording rate is a factor of an image capture rate of the first image capture device, or wherein the image capture rate of the first image capture device is set to be a multiple of the second image recording rate.

13. An image processing method, comprising:
    obtaining an incoming image stream comprising one or more first images captured by a first image capture device of an electronic device, wherein the incoming image stream is captured at a first image capture rate, wherein the one or more first images are recorded to a memory at a first image recording rate, and wherein the one or more first images are timestamped according to a first timeline;
    obtaining a positional data stream from one or more positional sensors of the electronic device, wherein the positional data stream is timestamped according to the first timeline;
    determining based, at least in part, on the obtained positional data stream and an image registration operation performed between a pair of the one or more first images, a second image recording rate that is different than the first image recording rate;
    obtaining one or more second images from the incoming image stream, wherein the one or more second images are recorded to the memory at the second image recording rate, wherein the one or more second images are captured subsequently to the one or more first images, and wherein the one or more second images are timestamped according to the first timeline; and
    combining at least the one or more first images and the one or more second images to generate a timelapse video.

14. The method of claim 13, wherein the first image recording rate is determined based, at least in part, on obtained positional data that is timestamped corresponding to a time on the first timeline before the capture of the one or more first images.

15. The method of claim 13, wherein the second image recording rate is determined based, at least in part, on obtained positional data that is timestamped corresponding to a time on the first timeline after the capture of the one or more first images.

16. The method of claim 13, further comprising:
    obtaining one or more third images from the incoming image stream,
    wherein the one or more third images are captured by the first image capture device at one or more image recording rates having recording rate values between the first image recording rate and the second image recording rate,
    wherein the one or more third images are captured subsequently to the one or more first images and prior to the one or more second images, and
    wherein the one or more third images are timestamped according to the first timeline, and
    wherein generating a timelapse video further comprises combining the one or more third images with the one or more first images and the one or more second images.

17. The method of claim 13, wherein the second image recording rate is a factor of an image capture rate of the first image capture device, or wherein the image capture rate of the first image capture device is set to be a multiple of the second image recording rate.

* * * * *